2

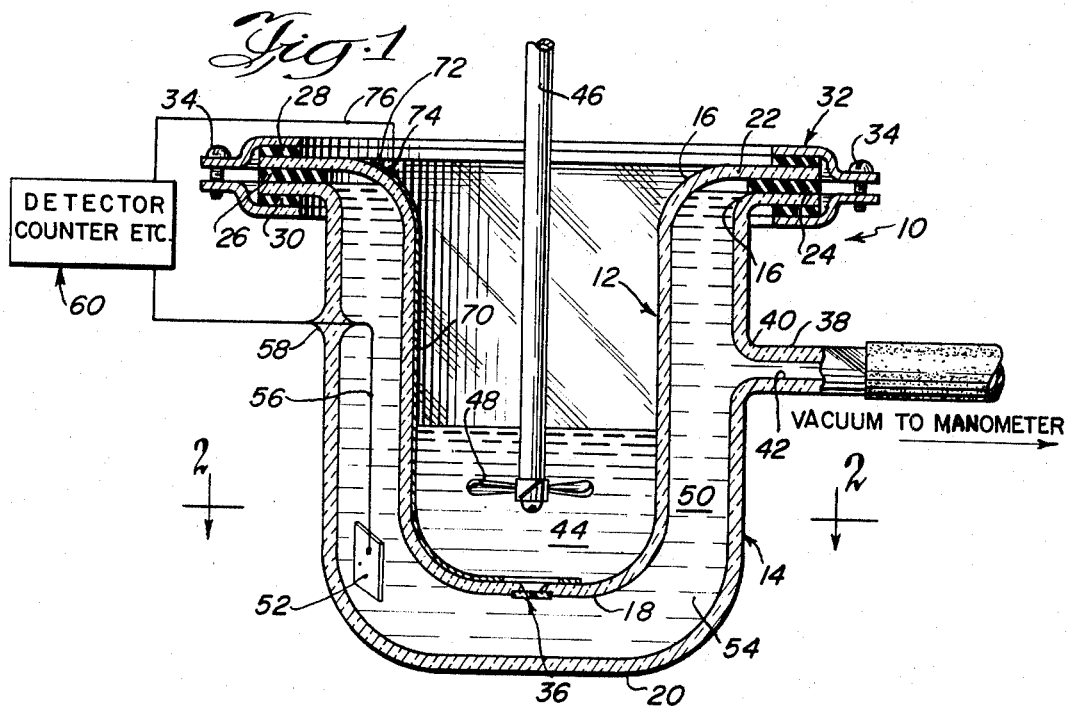
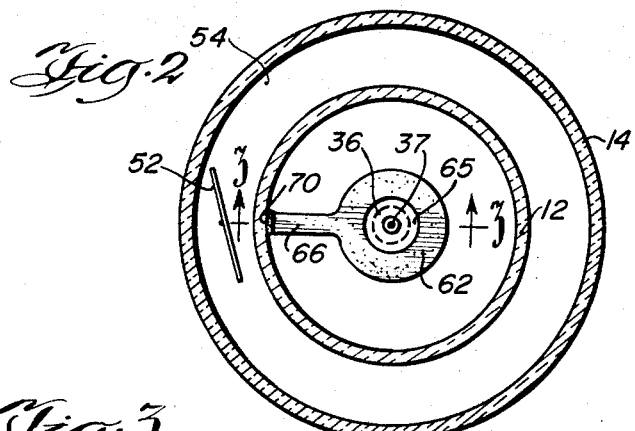
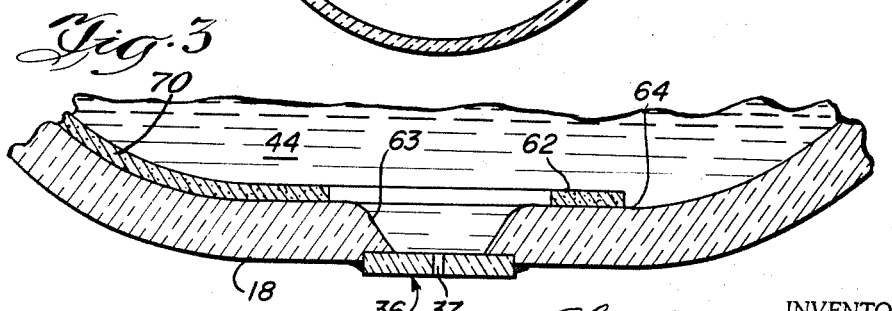

United States Patent Office 3,395,343
Patented July 30, 1968

3,395,343
ELECTRONIC PARTICLE STUDY APPARATUS AND VESSEL CONSTRUCTION THEREFOR
Charles T. Morgan, Danvers, Mass., and Wallace H. Coulter, Miami Springs, Fla., assignors to Coulter Electronics, Inc., Hialeah, Fla., a corporation of Illinois
Filed July 21, 1964, Ser. No. 384,061
11 Claims. (Cl. 324—71)

ABSTRACT OF THE DISCLOSURE

A vessel construction for use with an electronic particle study apparatus, particularly of the type known commercially as the Coulter electronic particle study device, said vessel construction comprising a pair of beaker-like vessels of insulating material arranged nested one within the other and having the rims thereof in sealed relationship to define an enclosed chamber, the inner one of the vessels functioning as the sample chamber and carrying a precise microscopic dimension aperture in the bottom wall thereof; electrode means being provided in each vessel, said electrode means including, as the electrode in the inner vessel, a conductive coating on the inner vessel surface at least partially surrounding said microscopic aperture and leading to terminal means for connection to means exterior of the vessel, said enclosed chamber communicating, by means of a conduit spaced from the vicinity of the microscopic aperture, to a vacuum source for drawing sample suspension from the inner vessel to the enclosed chamber through the aperture; and agitation means being provided disposed within the inner vessel: whereby a Coulter determination may be effected on suspensions of heavy particles to provide accurate size distribution studies of said particles, the said particles being recovered as a residuum from the enclosed chamber subsequent to such determination.

---

This invention relates generally to apparatus for studying the physical characteristics of particles suspended in a fluid medium of different electrical conductivity than said particles, said apparatus being commonly known as a Coulter electronic particle study apparatus. More particularly, this invention is concerned with the provision of a novel vessel construction particularly for use with a Coulter electronic particle study apparatus by means of which sample suspensions of particles may be studied using a principle of operation which has become known to the art as the Coulter principle, as elucidated in United States Patent 2,656,508, with subsequent substantially complete recovery of the sample. Usually such particles are heavier than those normally studied.

The Coulter principle asserts that a particle suspended in a fluid passing through a microscopic aperture changes the resistivity of the fluid within the aperture by an amount functionally related to the size of the particle. Accordingly, a suspension of the particles it is desired to be studied is prepared and placed in a first vessel and a second vessel having a small aperture in a side wall thereof is dipped into the first vessel. Fluid is sucked from the second vessel, drawing the suspension from the first vessel through the aperture. The quantity of fluid withdrawn is carefully metered as, for example, utilizing a fluid metering and scanning apparatus which has become familiarly associated with the commercially available Coulter devices known under the registered trademark "Coulter Counter," manufactured by Coulter Electronics, Inc. of Hialeah, Fla., and described in Coulter et al., U.S. Patent 2,869,078. Electrodes of noncorrosive metal are suspended in the fluid of both vessels and external leads pass from these respective electrodes to a detecting device such as the input of the counter circuitry. An electric current is caused to flow between the electrodes through the respective bodies of fluid and through the aperture. Each time a particle is drawn through the aperture there will be a detectable change in the resistivity of the aperture which will produce an electrical signal transmitted to the detector that can be measured and counted.

The second vessel referred to above has come to be known generally as a Coulter aperture tube and carries the aperture, said aperture tube being constructed as generally shown in Coulter et al., U.S. Patent 2,985,830. The aperture normally is formed by drilling a minute hole in a thin wafer of glass or preferably sapphire and cementing or fusing the wafer to a side wall of the aperture tube over a relatively larger orifice previously formed in the tube. The tube itself generally is of a configuration commonly encountered in test tubes, comprising an elongate, round bottomed tube, open at one end and having a rather narrow diameter. The portion of the tube having the aperture is formed with a flattened surface to facilitate the securement of the wafer thereto and to control the dimension and contour of the orifice. The aperture is positioned spaced from the round bottom of the aperture tube to facilitate flow of the suspension from one vessel to the other through the aperture without adverse statistical effects caused by drawing from a settled portion of the first vessel.

For purposes of this description, reference hereinafter is made to a structure termed "a Coulter scanning aperture means." In Coulter Patent 2,656,508, the said "scanning aperture" comprises an opening of microscopic proportion formed in the wall of the fluid holding vessel, through which particles are passed. As heretofore mentioned the said aperture may also be provided as taught in Coulter et al. U.S. Patent 2,985,830. In said latter patent, the microscopic dimensioned aperture is provided in a wafer of generally heat resistant material and a larger orifice is formed in the vitreous vessel, said orifice being of predetermined contour. The wafer carrying the microscopic dimensioned aperture is secured to the said vitreous vessel with the orifice and aperture aligned. The term "Coulter scanning aperture means" is used hereinafter in the description of a preferred embodiment of the invention and in the claims is intended to describe that portion of the vessel wall carrying the aperture and the aperture itself whereat the effects measured actually occur, and includes those types of structures forming the aperture of Patent No. 2,656,508 as well as those structures taught in Patent No. 2,985,830.

As taught in the aforementioned patents, the earlier type Coulter aperture tube functions as the said second vessel and is filled with fluid. Means are included for connection to a source of vacuum for withdrawing fluid from the said tube and means, such as shown in Patent 2,869,078, are provided to meter the amount of fluid withdrawn therefrom. The earlier sample holding vessel generally is a wide mouth beaker having an electrode disposed therein with the second electrode disposed in the aperture tube. Particles capable of being studied by means of a Coulter type apparatus are many and varied but all share common characteristics, that is, all are capable of being suspended in a fluid medium of conductivity different from that of the particles.

Since the particles in the sample suspension are carried through the aperture into the relatively small volume aperture tube and into the fluid system, the particles counted and sized are normally lost and never recovered, being removed from time to time with continued removal of the fluid from the interior of a Coulter aperture tube by the vacuum source. Many of the particles to be studied are valuable, as for example, extremely pure metals, gold, uranium, etc. Many particles are products in a continuing research program and require recovery, and further processing, testing and study. Many projects involve study of particles in a batch, while other particles are available only in limited research quantities. Thus substantially complete recovery of the particles to be studied is desired.

Another difficulty encountered with the use of the earlier vessel construction of a Coulter type apparatus, especially with heavier particles, is that a Coulter aperture tube is immersed in the sample containing vessel with the aperture therein spaced from the bottom of the sample containing vessel. Thus it was not possible to complete the sizing and count all the particles in the sample. In many types of studies, such as bearing wear studies, a complete count and sizing of substantially all the particles in the sample is required. Often statistical sampling was difficult with the prior vessel construction when heavier particles such as metals were considered. These heavier particles tended to separate from the suspension due to gravitational forces and collect near the bottom of the sample holding vessel spaced from the vicinity of the aperture. Agitation did not always solve the problem.

Accordingly, the principal object of the invention is to provide a vessel construction capable for use with a Coulter electronic particle study apparatus especially for the study of heavier mass particles, which construction substantially eliminates the above enumerated disadvantages of the earlier vessel construction and enables substantially complete recovery of the tested samples.

Another object of this invention is to provide a vessel construction for use with a Coulter apparatus wherein the sample holding vessel is immersed in a second, fluid containing vessel, said sample holding vessel having Coulter scanning aperture means provided in the bottom wall thereof thereby permitting the counting and sizing of substantially all particles in a given suspension.

Another object of the invention is to provide a vessel construction of the character described wherein the sample holding vessel is an open-mouth cylindrical vessel nested and sealed within a larger, second vessel to define a fluid holding chamber, each of said vessels having a flat bottom wall and said bottom walls being spaced one from the other and a Coulter scanning aperture means are provided in the bottom wall of said sample holding vessel, and means are provided to connect said chamber to a source of vacuum and to exert said vacuum upon the fluid in said chamber to draw suspension through the scanning aperture from the sample holding vessel to the second vessel, said last means being located displaced relative to the second vessel to permit the scanned particles to accumulate at the bottom thereof instead of being drawn off with the fluid.

A further object of the invention is to provide a vessel construction for use with a Coulter Electronic Particle Study apparatus which comprises a pair of cylindrical vessels, one smaller than the other, nested and seated one within the other to define an enclosed chamber, the inner vessel having a relatively flat bottom wall and a mouth open to the atmosphere, said inner vessel being provided with a Coulter scanning aperture means in the bottom wall thereof and functioning as a sample holding vessel, the outer vessel being filled with fluid, and means for exerting a vacuum upon the outer vessel to draw sample suspension through the said aperture, said last means being located displaced relative said aperture means to permit the particles drawn through the aperture to accumulate in the outer vessel instead of being drawn off by the source of vacuum.

Another object of the invention is to provide a combined electrode and inner, sample holding vessel which will permit agitation of the sample suspension without being subject to damage by the agitation device, said electrode comprising a coating of electrically conductive material bonded to the interior surface of the inner vessel, and having a first portion of the bottom wall of the vessel surrounding the aperture of a Coulter scanning aperture means and a second portion thereof extending from said first portion radially to and then axially along the side wall of the said inner vessel and terminating above the normal level of the sample suspension therein, and means being provided for electrical connection of said coating to the counting and detection circuitry of a Coulter electronic particle study apparatus.

Other objects of this invention reside in the provision of a vessel construction of the character described which will expand the fields of use, and enhance the versatility and utility of a Coulter electronic particle study apparatus; and, which is simple and economical to manufacture, service and operate.

Still other objects and advantages of the invention will be recognized as the description of the invention proceeds in which the details of the preferred embodiment thereof are set forth. The drawing illustrates the same and in said drawing:

FIG. 1 is a sectional view with portions shown in elevation of the vessel arrangement constructed in accordance with the invention and having some of the elements of the Coulter type apparatus associated therewith.

FIG. 2 is a section view of the vessel arrangement of FIG. 1 taken along the line 2—2 of FIG. 1 and in the direction indicated.

FIG. 3 is a fragmentary sectional view on an enlarged scale taken along line 3—3 of FIG. 2 and in the direction indicated.

Referring now to the drawing, the vessel construction is generally designated 10 and is formed of an inner vessel 12 nested and sealed within an outer vessel 14 to provide an inner chamber 54 therebetween. The vessels 12 and 14 are of beaker-like configuration, of similar form, but the one is smaller than the other. Each is formed of electrical insulating material such as glass. Each has an annular lip 16 and a relatively flat bottom wall, the bottom walls 18 and 20 being spaced from one another. The lips 16 are held together in sealed engagement by clamp 32 pressing annular gaskets 28 and 30 against said lips with another annular gasket 26 sandwiched between. Screws 34 on the circumference of the clamp 32 enable some to be tightened. The clamp is annular in the configuration and has a central opening 31 to give access to the inner vessel 12.

The inner vessel 12 is provided with Coulter scanning aperture means such as a wafer 36 in its bottom wall 18, preferably centrally located thereon. The aperture 37 is formed in wafer 36 and the arrangement is similar to the structure disclosed in Coulter et al. Patent 2,985,830. The wafer 36 may be mounted upon said bottom wall 18 by the method disclosed in said Coulter et al. patent. As shown in FIG. 3, the wafer 36 having aperture 37 therein is mounted coaxially with the contoured orifice 63 formed in the bottom wall 18 of inner vessel 12. The wafer 36 is preferably mounted on the outer surface of said bottom wall 18 so that the aperture 37 is located at the lowermost level of the inner vessel. In this way the aperture 37 functions in the manner of a drain so that all the suspension within inner vessel 12 may be passed through the said aperture 37. The orifice 63 may be also of funnel-like contour or configuration, tapering toward the aperture 37 so as further to facilitate the smooth passage of all the particles of the suspension through said aperture.

The second or outer vessel 14 has an outlet pipe 38 secured integral with the wall thereof spaced below the rim 24 as shown at 40. The pipe 38 has a bore 42 communicating at one end with the chamber 54 of vessel 14 and adapted to be connected at the opposite end thereof to a source of vacuum (not shown). One may also provide for the metering of suspension passing from vessel 12 to vessel 14 through the aperture 37 by including a metering device (not shown), as taught in Coulter et al. Patent 2,869,078, although the apparatus normally will be operated until all of the suspension has been sucked through into the bottom vessel 14.

The first vessel 12 is adapted to contain the suspension 44 of particles to be studied. Suspension 44 may include particles of heavier than average mass or may comprise a suspension entirely of heavy mass particles. Comminuted metals and the like are especially suitable for study with this apparatus. An electric or mechanical agitator device 46 is shown with its propeller 48 immersed in said suspension spaced above the aperture 37. The outer vessel 14 is filled entirely with the suspending fluid medium 50 to assure application of vacuum to the aperture 37.

A platinum foil electrode 52 is disposed on the interior of the vessel 14 within the chamber 54 defined by the said vessels 12 and 14. The electrode 52 is connected by a lead 56 sealed in and led through the wall of said vessel at a location 58 preferably circumferentially spaced from the outlet pipe 38, and connected thence to the counting and detecting circuitry 60 of the Coulter electronic particle study device. A second connection to the counting circuitry 60 is required to establish electrical connection with the body of the fluid suspension 44. This connection will now be described.

The bottom wall 18 of the vessel 12 is provided with a coating 62 of full or partial ring configuration adhered to the glass surface of inner wall 64 thereof, the coating being of platinum or similar metal. The ring 62 is coaxial with the aperture 37 and surrounds the orifice 63 thereof either entirely or partially. A narrow band 66 of said coating extends radially from said ring to the inner wall 68 of said vessel 12 to join an axially extending, narrow band 70 of said coating, said band 70 terminating at 72 closely adjacent rim 22 of said vessel 12. A platinum wire 74 is welded or soldered to the band at 72 to enable connection of electrical lead 76 thereto and said second electrical connection to be made to the Coulter counting and detecting circuitry 60.

The outlet conduit or pipe 38 is disposed at a location displaced a considerable distance from the aperture 37 and spaced above the bottom wall of the vessel 14. Thus, the heaver particles passing through the aperture will accumulate preferentially at the bottom wall in the vicinity of the aperture 37 instead of being drawn off with the fluid as a result of the suction created by the vacuum source (not shown). After the sample run has been completed, the vessels 12 and 14 may be disassembled by release of clamping means 32 and the accumulated sample particles substantially completely recovered.

The location of Coulter scanning aperture means 36 in the bottom wall of the inner vessel 12 enables the operator to count and size substantially all the particles in a given sample suspension. Further, the agitation device 46 may be controlled whereby to control the rate of fall of the heavier particles toward the aperture and hence prevent clogging of the aperture or accumulation of some particles at the bottom of the inner vessel 12. Repeated additions of suspending fluid, as by washing procedures, can succeed in passing substantially the entire sample through the aperture 37 for counting and sizing. This repeated washing is permitted since access to the inner vessel is readily available. The complete analysis is permitted because the aperture 37 is disposed at the lowermost level relative to the vessel 12 functioning as a drain therefor, the few particles possibly accumulating upon the bottom wall 18 being directed through the aperture 37 by such washing procedure. The funnnel-like orifice 63 tapering toward the aperture 37 also appreciably aids in facilitating the draining of the suspension from the vessel 12.

The inner diameter of the ring coating 62 used for one example was approximately ¼ inch, while the width of bands 68 and 70 were approximately ¼ inch. The diameter of the uncoated, center portion 65 of the ring immediately surrounding the Coulter aperture was substantially larger than the diameter of the aperture 37 and is chosen to avoid high current densities in the vicinity of the aperture 37.

With respect to the particular type of coating, a platinum paint is available from the E. I. Du Pont de Nemours Company of Wilmington, Del., which is painted on and baked in accordance with the instructions of the manufacturer.

What it is desired to secure by Letters Patent of the United States is:

1. A vessel construction for use with an electronic particle study device of the type wherein a suspension of particles is analyzed by passage of said suspension from one vessel to another vessel through a microscopic aperture, said passage being caused by means exterior of said vessels, the aperture being provided in a wall of one of said vessels, and each vessel adapted to have a portion of said suspension contained therein with the said portions insulated electrically one from the other except through said aperture, said device further including circuit means for establishing an electric path through said aperture whereby signals may be generated by the passage of particles through said aperture: said vessel construction comprising; a pair of open-top vessels one smaller than the other and arranged nested one within the other and sealed together defining an enclosed chamber, one of said suspension portions adapted to be received in the enclosed chamber and the other portion containing particles suspended in a fluid medium adapted to be received in the inner vessel; the inner vessel having a bottom wall and scanning aperture means, including a microscopic aperture, carried by said bottom wall; and conduit means on the outer vessel for connection to said means exterior of the vessels for causing flow of the particles through the aperture.

2. The vessel construction as claimed in claim 1 in which means are provided for releasably clamping said pair of vessels in sealed relationship.

3. The vessel construction as claimed in claim 1 in which said a pair of vessels respectively have annular rims and means are provided releasably to clamp said a pair of vessels at their annular rims in sealed relationship.

4. The vessel construction as claimed in claim 1 in which a coating of electrically conductive material is bonded to the inner bottom wall of said inner vessel at least partially surrounding said aperture, a portion of said coating extending continuously to and axially along the inner wall of said inner vessel terminating above the normal level of the suspension in the said inner vessel, and means adjacent the terminal end of said coating for electrically connecting same exterior of said inner vessel.

5. A vessel construction for use with an electronic particle study device of the type wherein a suspension of particles is analyzed by passage of said suspension from one vessel to another vessel through a microscopic aperture, said passage being caused by means exterior of said vessels, the aperture being provided in a wall of one of said vessels and each vessel adapted to have a portion of said suspension contained therein with said portions insulated electrically one from the other except through said aperture, said device further including circuit means for establishing an electric path through said aperture whereby signals may be generated by the passage of particles through said aperture; said vessel construction comprising a vessel structure defining first and second chambers, the first chamber being openend to the atmosphere and adapted to contain one of said portions of the suspension, the second chamber partially surrounding the first chamber and being sealed and adapted to contain the other of said suspension portions, aperture means disposed between the first and second chambers for sole communication therebetween, conduit means for connecting the second chamber to said means exterior of said vessels for causing passage of the particles through said aperture, said conduit means being displaced from asid aperture means and located at a horizontal level relative to the inner vessel between the rim and the bottom wall thereof whereby the particles entering said second chamber will remain within the second chamber preferentially to being drawn therefrom to enable substantially complete recovery of the particles.

6. The structure as claimed in claim 5 in which said vessel structure comrpises a pair of vessels of flat bottomed, open mouth configuration nested one within the other, said vessels being of size and configuration whereby at least the bottom walls thereof are spaced one from the other in the nested arrangement, means for securing said vessels sealably one to the other to define said second chamber, the inner one of said vessels defining said first chamber, said Coulter scanning aperture means carried by the bottom wall of the inner one of said vessels.

7. A vessel construction as defined in claim 5, further including first and second electrodes disposed within the first and second chambers respectively and thereby constituting elements of said circuit means, said electrode in the first chamber comprising a coating of electrically conductive material bonded to the structure defining said first chamber at least partially surrounding said aperture means and having a portion thereof extending above the normal level of the suspension for electrical connection exterior of said first chamber, the second electrode being disposed in the second chamber and adapted for connection exterior of said second chamber.

8. In combination, an electronic particle study apparatus and the vessel construction therefor, said combination comprising; a pair of vessels of electrical insulating material nested one within the other, the bottom walls thereof bing spaced one from the other to define a chamber therebetween, means for releasably clamping said vessels one to the other in sealed relationship, aperture means associated with the bottom wall of the inner vessel, said inner vessel adapted to receive therein a fluid suspension of the articles to be studied whereby means exterior of said vessels can be utilized to draw the fluid suspension of the particles to be studied whereby means exchamber through said aperture, and circuit means defining an electric path through said aperture such that signals may be generated upon connection of said circuit means to a power source and passage of said suspension through said aperture, and conduit means on the outer vessel for connection to said means exterior of said vessels, said conduit means being displaced from said aperture and located at a horizontal level relative to the inner vessel between the rim and the bottom thereof to enable substantial recovery of the sample of the outer vessel.

9. The construction as claimed in claim 8 and a coating of electrically conductive material bonded to the inner wall and bottom surfaces thereof with a portion of said coating at least partially surrounding said aperture, said coating forming an electrode immersed in the sample suspension.

10. In electronic particle study apparatus wherein a suspension of particles is analyzed which includes; a first vessel adapted to have at least a portion of a suspension disposed therein, a second vessel also adapted to contain a portion of said suspension, aperture means including a minute aperture whereby said suspension of particles may be caused to pass through said aperture thereby varying the resistivity of that portion of the suspension in said aperture each time a particle passes therethrough, first and second electrodes disposed within said first and second vessels respectively, and a resistivity change detecting device having its input connected to said electrodes, the improvement herein which comprises, said first and second vessels each being formed of beaker-like configuration and being arranged in nested relationship with at least their bottom walls spaced one from the other, said scanning aperture being formed in the bottom wall of the inner vessel, and means releasably securing said vessels sealably one to the other at the rims thereof, said aperture being located at the lowermost level of said inner vessel.

11. The structure as claimed in claim 10 and agitation means in the inner vessel.

References Cited

UNITED STATES PATENTS

| | | | |
|---|---|---|---|
| 2,624,463 | 1/1953 | Freese | 210—532 |
| 2,656,508 | 10/1953 | Coulter | 324—71 |
| 2,762,218 | 9/1956 | Ohlheiser | 324—71 XR |
| 2,985,830 | 5/1961 | Coulter et al. | 324—71 |
| 3,040,250 | 6/1962 | Von Fuchs | 324—54 |
| 3,165,693 | 1/1965 | Isreeli et al. | 324—71 |

FOREIGN PATENTS

| | | |
|---|---|---|
| 62,171 | 12/1948 | Netherlands. |
| 134,449 | 2/1930 | Switzerland. |

RUDOLPH V. ROLINEC, *Primary Examiner.*

E. E. KUBASIEWICZ, *Assistant Examiner.*

UNITED STATES PATENT OFFICE
CERTIFICATE OF CORRECTION

Patent No. 3,395,343                                      July 30, 1968

Charles T. Morgan et al.

It is certified that error appears in the above identified patent and that said Letters Patent are hereby corrected as shown below:

Column 1, line 48, "Coulter" should read -- Coulter type --. Column 6, line 68, "openend" should read -- opened --. Column 7, line 17, cancel "Coulter scanning"; line 35, "bing" should read -- being --; line 40, "articles" should read -- particles --.

Signed and sealed this 23rd day of December 1969.

(SEAL)
Attest:

Edward M. Fletcher, Jr.                           WILLIAM E. SCHUYLER, JR.
Attesting Officer                                          Commissioner of Patents